US010977312B2

(12) United States Patent
Wedum et al.

(10) Patent No.: US 10,977,312 B2
(45) Date of Patent: Apr. 13, 2021

(54) APPARATUS AND METHOD FOR INFERRING AN ORIGIN

(71) Applicant: GOOGLE LLC, Mountain View, CA (US)

(72) Inventors: Petter Wedum, Zurich (CH); Marek Turski, Zurich (CH)

(73) Assignee: Google LLC, Mountain View, CA (US)

( * ) Notice: Subject to any disclaimer, the term of this patent is extended or adjusted under 35 U.S.C. 154(b) by 129 days.

(21) Appl. No.: 16/276,586

(22) Filed: Feb. 14, 2019

(65) Prior Publication Data

US 2020/0265093 A1    Aug. 20, 2020

Related U.S. Application Data

(63) Continuation of application No. 14/030,017, filed on Sep. 18, 2013, now abandoned.

(60) Provisional application No. 61/704,235, filed on Sep. 21, 2012.

(51) Int. Cl.
*G06F 16/9032* (2019.01)
*G06F 16/9535* (2019.01)
*G06F 16/909* (2019.01)
*G06F 16/9536* (2019.01)

(52) U.S. Cl.
CPC ........ *G06F 16/9032* (2019.01); *G06F 16/909* (2019.01); *G06F 16/9535* (2019.01); *G06F 16/9536* (2019.01)

(58) Field of Classification Search
None
See application file for complete search history.

(56) References Cited

U.S. PATENT DOCUMENTS

| 7,080,021 | B1 | 7/2006 | McCulloch | |
|---|---|---|---|---|
| 7,472,006 | B2 | 12/2008 | Turski et al. | |
| 2004/0078251 | A1 | 4/2004 | DeMarcken | |
| 2004/0153348 | A1* | 8/2004 | Garback | G06F 16/24 707/999.003 |
| 2005/0108213 | A1* | 5/2005 | Riise | G06F 16/9537 |
| 2006/0265361 | A1* | 11/2006 | Chu | G06F 16/9535 |
| 2007/0208570 | A1* | 9/2007 | Bhardwaj | G06F 16/3331 707/999.003 |

(Continued)

FOREIGN PATENT DOCUMENTS

| WO | 2008/086155 A2 | 7/2008 | |
|---|---|---|---|
| WO | WO-2008086155 A2 * | 7/2008 | ......... G06F 16/9574 |
| WO | 2012/095613 A1 | 7/2012 | |

OTHER PUBLICATIONS

U.S. Appl. No. 14/030,017 to Petter Wedum et al., filed Sep. 18, 2013.

(Continued)

*Primary Examiner* — Son T Hoang
(74) *Attorney, Agent, or Firm* — Dority & Manning, P.A.

(57) ABSTRACT

A process provides information to users about trips. The process may include receiving a user request to obtain information about trips; obtaining a geographic location of the user; selecting, with a computer, an origin based on both a distance from the geographic location of the user to a geographic location of the origin and a trip-volume value indicative of an amount of trips departing from the origin; obtaining a trip departing from the selected origin; and presenting the obtained trip to the user via a graphical user interface.

20 Claims, 3 Drawing Sheets

(56) References Cited

U.S. PATENT DOCUMENTS

| | | | |
|---|---|---|---|
| 2007/0260495 A1* | 11/2007 | Mace | G06Q 10/02 705/5 |
| 2008/0016055 A1 | 1/2008 | Riise et al. | |
| 2008/0167912 A1 | 7/2008 | De Marcken | |
| 2009/0006278 A1 | 1/2009 | Baggett | |
| 2011/0106574 A1 | 5/2011 | De Marcken et al. | |
| 2011/0166898 A1 | 7/2011 | Zarrow | |
| 2011/0213833 A1 | 9/2011 | De Marcken et al. | |
| 2011/0225188 A1 | 9/2011 | Lopinto | |
| 2011/0270715 A1 | 11/2011 | Moorhead | |
| 2012/0143502 A1 | 6/2012 | Sanchez et al. | |
| 2012/0143859 A1 | 6/2012 | Lymperopoulos et al. | |
| 2012/0185507 A1 | 7/2012 | Paparizos et al. | |
| 2013/0166329 A1* | 6/2013 | Arnoux-Prost | G06Q 10/02 705/5 |

OTHER PUBLICATIONS

Shorter "U.S. Office Action issued in copending U.S. Appl. No. 14/030,017, filed Sep. 18, 2013", dated Apr. 7, 2016, 25 pages.
Shorter "U.S. Office Action issued in copending U.S. Appl. No. 14/030,017, filed Sep. 18, 2013", dated Apr. 13, 2017, 25 pages.
Shorter "U.S. Office Action issued in copending U.S. Appl. No. 14/030,017, filed Sep. 18, 2013", dated Jan. 22, 2018, 28 pages.
Shorter "U.S. Office Action issued in copending U.S. Appl. No. 14/030,017, filed Sep. 18, 2013", dated Nov. 14, 2018, 29 pages.
Shorter "U.S. Office Action issued in copending U.S. Appl. No. 14/030,017, filed Sep. 18, 2013", dated Oct. 23, 2015, 19 pages.
Shorter "U.S. Office Action issued in copending U.S. Appl. No. 14/030,017, filed Sep. 18, 2013", dated Sep. 22, 2017, 29 pages.

* cited by examiner

APPARATUS AND METHOD FOR INFERRING AN ORIGIN

CROSS REFERENCE TO RELATED APPLICATIONS

This application is a continuation of and claims priority to U.S. patent application Ser. No. 14/030,017 filed Sep. 18, 2013, and entitled "Apparatus and Method for Inferring an origin Airport," which claims priority to the U.S. Provisional Application No. 61/704,235 filed Sep. 21, 2012. The complete disclosure of the above-identified priority applications is hereby fully incorporated herein by reference.

TECHNICAL FIELD

The present invention relates generally to search engines and, more specifically, to inferring an origin in trip search engines.

BACKGROUND

Users typically have a strong preference for trip search engines that are relatively easy to use. When researching trips on a trip search engine, a user may enter multiple queries, iterating through various options to identify a trip that is appropriate to their trip constraints, and the cumulative effect of specifying all of these queries can place a relatively large cognitive burden on the user, particularly when the task is accompanied with configuring other aspects of a trip, typically a taxing endeavor. This burden can deter users from further research to improve their trips and lead to inferior selections of trips by the users.

SUMMARY

The following is a non-exhaustive listing of some aspects of the present techniques. These and other aspects are described in the following disclosure.

Some aspects include a process for providing information to users about trips. The process may include receiving a user request to obtain information about trips; obtaining a geographic location of the user; selecting, with a computer, an origin based on both a distance from the geographic location of the user to a geographic location of the origin and a trip-volume value indicative of an amount of trips departing from the origin; obtaining a trip departing from the selected origin; and presenting the obtained origin to the user.

Some aspects include a system having one or more processors and memory storing program code that when executed by the one or more processors causes the one or more processors to perform operations including the following: receiving a user request to obtain information about trips; obtaining a geographic location of the user; selecting an origin based on both a distance from the geographic location of the user to a geographic location of the origin and a trip-volume value indicative of an amount of trips departing from the origin; obtaining a trip departing from the selected origin; and presenting the obtained trip to the user.

Some aspects include a tangible, machine-readable medium storing instructions that when executed by a data processing apparatus causes the data processes apparatus to perform operations including the following: receiving a user request to obtain information about trips; obtaining a geographic location of the user; selecting an origin based on both a distance from the geographic location of the user to a geographic location of the origin and a trip-volume value indicative of an amount of trips departing from the origin; obtaining a trip departing from the selected origin; and presenting the obtained trip to the user.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
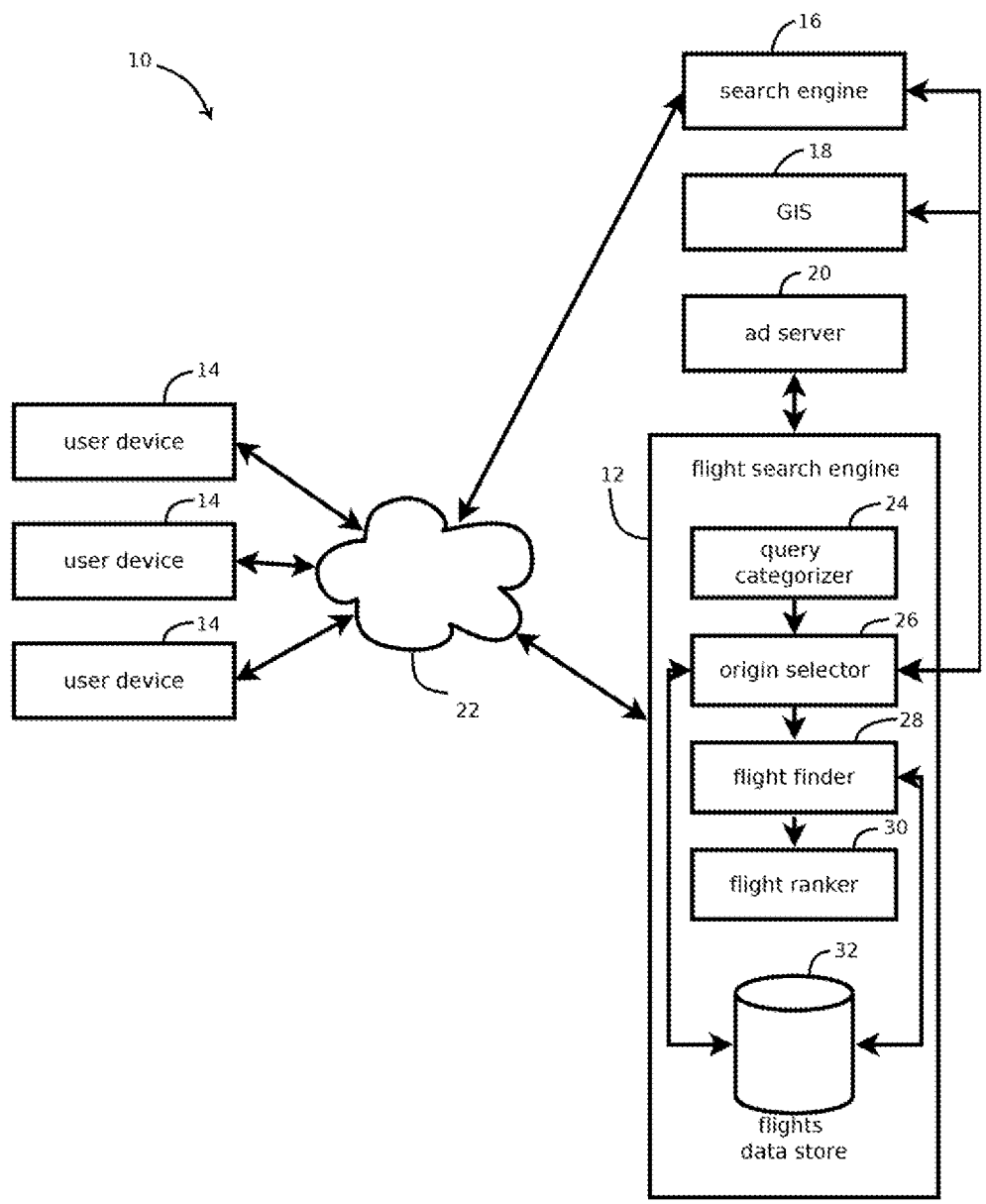
FIG. 1 illustrates an embodiment of a flight search engine.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

FIG. 1 illustrates an embodiment of a system 10 for providing users with information about airline flights. To facilitate access to such information, the system 10 includes a flight search engine 12 that, in some embodiments, is capable of inferring an origin airport from which the user is likely to depart so that relevant information can be provided to a user who has not yet specified an origin airport. In some embodiments, the origin airport is determined by obtaining a geographic location of the user, determining which airports are within a threshold distance (e.g. 30 km) of the location, and selecting from among these airports the airport having the largest number of scheduled flights for some duration (e.g., six months) in the future. Thus, some embodiments infer what is likely to be the origin airport of the user by identifying an airport that is both near the user and is relatively large. Based on this determination, some embodiments provide the user with one or more flights (e.g., information describing those flights) from the inferred origin airport without imposing on the user the burden of specifying the airport from which they wish to depart.

For example, a user in Mountain View Calif. may submit a query for "flights to New York," which indicates an intent to obtain information about flights, but does not indicate from where the user wishes to fly in the text of the query. In response, some embodiments of the flight search engine 12 determine the user's location (e.g. a latitude and longitude of the user) based on, for example, an Internet Protocol address of the user (or with other techniques described below). These embodiments may further determine that both the San Jose International Airport and the San Francisco International Airport are within 30 km of the user's location and that, between these two airports, San Francisco International Airport has more flights scheduled over the next six months. Based on these determinations, the flight search engine 12 may infer that the user is interested in flights from San Francisco International Airport to New York and, in response, provide the user with descriptions of one or more flights satisfying these criteria, thereby providing the user with information that is likely more relevant than would be produced by a search based on the query text alone.

The flight search engine 12 cooperates with other components of the system 10 to provide information about flights to users. In some embodiments, the system 10 includes user devices 14, a search engine 16, a geographic information system 18, and an advertisement server 20. These components 12, 14, 16, 18, and 20 may communicate with one another via the Internet 22 and various other networks, such as cellular networks and local area networks. The user devices 14 may be desktop computers, laptops, handheld battery-powered mobile personal computing devices, such as smartphones or tablet computers, through which users interact with the search engine 16 or the flight search engine 12. User interaction may occur via a browser or special-purpose application executing on the user devices 14.

The search engine 16 may be a general-purpose search engine that is responsive to queries other than those about airline flights. The search engine 16 may be operative to determine which queries express an intent of the user to obtain information about airline flights, for example by detecting the presence of keywords, phrases, or patterns in query text, like "flight," "fly," "flights," "plane to," or the names of various airports (e.g., airport codes). In response to determining that a query received from the user relates to flights, the search engine 16 may submit the query to the flight search engine 12. Alternatively, or additionally, the search engine 16 may be operative to determine whether a query relates to an airport near the user and, in response, request that the flight search engine 12 identify a likely origin airport for the user.

Some embodiments include a geographic information system 18 that is operative to geocode search terms, such as airport names, by retrieving a geographic location associated with (e.g., uniquely matched to) the search term, such as a latitude and longitude of an airport. The geographic information system 18 may also be operative determine a likely travel (e.g., driving, biking, or rail) route between the user and the airport, the distance along this route, and travel time along this route.

The advertisement server 20 may be operative to receive requests for advertisements related to queries and select a responsive advertisement for display on user devices 14, for example advertisements related to travel to a destination airport, or offers to buy airline tickets for flights from the inferred origin airport. The selected advertisements are communicated to the user devices 14 for display to the user.

In the illustrated embodiment, the flight search engine 12 includes a query categorizer 24, an origin selector 26, a flight finder 28, a flight ranker 30, and a flights data store 32. These components 24, 26, 28, 30, and 32 are illustrated as discrete functional blocks, but it should be appreciated that code or hardware by which these components are implemented may be distributed, conjoined, intermingled, or otherwise differently organized than is illustrated by FIG. 1. In some embodiments, the flight search engine 12 and the components thereof are embodied by a data processing apparatus, such as one or more processors in communication with memory storing instructions that when executed by the processors cause the processors to perform operations providing the functionality described herein. The flight search engine 12, in operation, may perform a process described in greater detail below with reference to FIG. 2.

Some embodiments include the illustrated query categorizer 24, which is operative to determine whether a query identifies an origin airport. In response to determining that the query identifies an origin airport, the flight search engine 12 may return flights from the identified origin airport rather than inferring an origin airport based on the user's location. The query categorizer 24 may determine that an origin airport is identified based on, for example, the presence of strings corresponding to multiple airports preceded by the term "from" and including the term "to," such as "flights from AUS to Portland" for Austin Bergstrom International Airport and Portland. If an origin airport is detected in the query text, in response, the query analyzer 24 may bypass the origin selector 26 and request that the flight finder 28 identify flights responsive to the query. Alternatively, if an origin airport is not detected, in response, the query categorizer 24 may request that the origin selector 26 infer an origin airport.

In some embodiments, the origin selector 26 is operative to obtain the geographic location of the user and select an origin airport. The selection may be based on both a distance from the geographic location of the user to a geographic location of the airport and a flight-volume value indicative of an amount of flights departing from the airport. Examples of selections are described in detail below with reference to FIG. 2. In some embodiments, the origin selector 26 is also operative to receive a user location from the search engine 16 and respond with a likely origin airport of that user based on the same selection process.

In some embodiments, the flight finder 28 is operative to receive an inferred origin airport from the origin selector 26 and identify flights from the origin airport responsive to the received query. For example, a query from a user geocoded to a location in Mountain View Calif. may state "flights to New York," and the origin selector 26 may identify to the flight finder 28 that the likely origin airport is San Francisco International Airport. In response, the flight finder 28 may query the flights data store 32 for flights from San Francisco International Airport to airports near New York City (e.g., the closest airport or airports within a threshold distance to New York City, such as within 30 km).

The identified flights may be of varying interest to the user, for example, because some of the flights include multiple legs, layovers, higher costs, or are during times at which it is less likely that the user will wish to fly, such as in the relatively near (e.g. within two days) or relatively distant (e.g. more than three months) future. Accordingly, the flight ranker 30 may rank the identified flights by calculating a flight ranking score based on these parameters. Further, some embodiments may filter from the results flights that have sold out to avoid burdening the user with information upon which it would be difficult for the user to act. Flights ranking higher than a threshold rank, such as 2, 10, or 20 flights, may be presented to the user by, for example, transmitting to the user device 14 from which the query was received a description of the flight and instructions to display the description in a browser of the user device. In some embodiments, the flight search engine 12 may also transmit with the description a link to a service by which the corresponding flights can be purchased by the user or advertisements selected by the advertisement server 20 based on the query or flights.

The flights data store 32 of this embodiment includes a plurality of flight records, each record corresponding to one flight and specifying an origin airport, a destination airport, an airline, a price, a number of seats available at the price, a departure time, an arrival time, a flight duration, and a number of intermediate stops at intermediate airports. In some embodiments, the flights data store 32 also includes a plurality of records about airports, each record corresponding to one airport and including one or more names of the airport (e.g., various names by which the airport is known to users, including three-letter airport codes) and a geographic location of the airport, for example expressed as a latitude and longitude of the airport or as a tile identifier corresponding to a record in the geographic information system 18. Or the airport records may be stored in the geographic information system 18.

Thus, in some embodiments, the components of the flight search engine 12 may cooperate to infer an origin airport of a user based on the user's location and identify flights from the origin airport to the user without imposing upon the user the burden of identifying the origin airport for the flight search engine 12.

Figure 2:
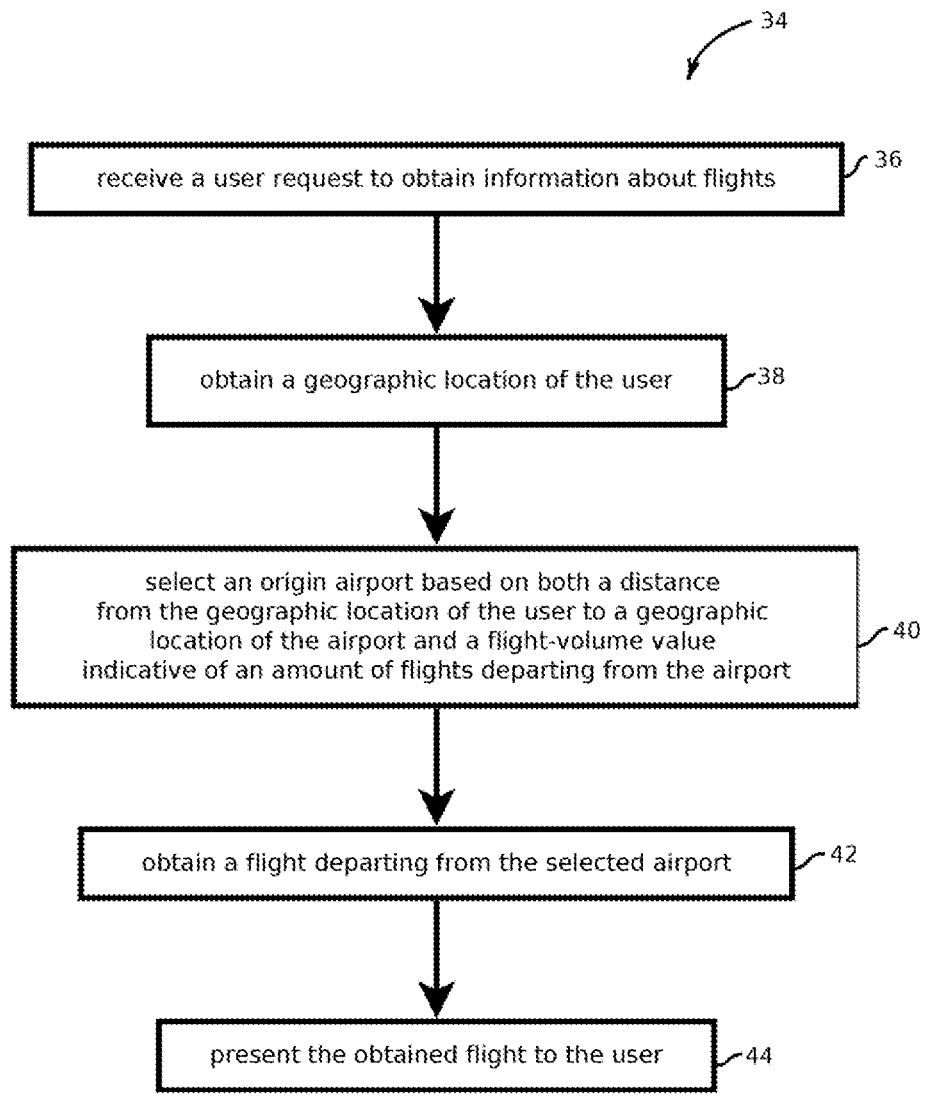
FIG. 2 illustrates an embodiment of a process for determining an origin airport of a user.

FIG. 2 illustrates an embodiment of a process 34 for providing information about flights. The process 34 may be performed by the flight search engine 12 described with reference to FIG. 1, and in some embodiments, the process 34 is performed by one or more computer systems storing in memory program code that, when executed, causes the computer systems to perform process 34. The steps of process 34 may be performed in a different order from the order in which they are illustrated.

In some embodiments, the process 34 includes receiving a user request to obtain information about flights, as illustrated by block 36. Receiving a user request may include receiving any of a variety of different indications that a user has performed an act expressing an interest in obtaining information about flights. For example, a user may navigate their browser to a URL of a flight search engine that is dedicated to providing information about flights, such as "www.google.com/flights." Or the user may launch a smartphone application that is operative to obtain information about flights and is dedicated to obtaining such information, e.g., a flight search app. In another example, a user may submit a query including search terms that indicate an intent to obtain information about flights, such as a query including the strings "flights," "fly," or "airplanes to." The request may be received by the search engine 16 or flight search engine 12 of FIG. 1 from one of the user devices 14.

In some embodiments, the process 34 includes obtaining a geographic location of the user, as indicated by block 38. Obtaining a location of the user may include determining that the user has opted to have their location detected and determining the geographic location of only those users who have so elected. The geographic location of the user may be expressed in a variety of formats, for example as a point identified with a latitude and a longitude, as an area having a center from which distance can be calculated, or as a relative geographic location, such as a direction and a distance from some landmark. The user's location may be identified with various amounts of specificity, depending on the embodiment and desire for precision, e.g., to a point, to within less than a 1 km radius, or to within less than a 10 km radius.

The geographic location may be obtained with a variety of techniques. For example, the user request may be received via a protocol (like TCP/IP, HTTP, or SPDY) that identifies the Internet Protocol address of the user (e.g., a network node through which the user's request enters the Internet), and the Internet Protocol address may be geocoded to a location of the user. In another example, the user may have an account (e.g., an email account or social network account) in a user data store accessible to the flight search engine 12, and the user account may be identified based on credentials provided by the user. The user account may include a location specified by the user, e.g., a residential address. In another example, the location of the user may be determined based on the current wireless environment of the user device 14 of the user, for instance based on global positioning system signals (such as from the GPS, GLONASS or Galileo satellite systems), cell tower triangulation, or the presence of wireless area networks having a known location and for which the administrator has opted in to storing the location.

The process 34 further includes selecting an origin airport based on both the distance from the geographic location of the user to a geographic location of the airport and a flight-volume value indicative of an amount of flights departing from the airport, as illustrated by block 40. This step 40, in some embodiments, is performed by the origin selector 26 described above. Some embodiments also perform the selection based on other parameters by, e.g., removing from consideration airports that are not accessible via public transportation.

In some embodiments, selecting an origin airport includes determining that a plurality of airports are within a threshold distance. This determination may be performed by querying the flights data store 32 or the geographic information system 18 for airports and their corresponding locations and filtering out from further consideration those airports that are further than the threshold distance, such as further than a distance between 20 km and 80 km, 5 km and 150 km, or 1 km and 250 km, e.g. a 30 km threshold distance. Distance may be calculated with a variety of techniques. For example, a distance may be calculated by subtracting the latitudes of the airport and the user and the longitudes of the airport and the user and calculating the square root of the sum of squares of these differentials to calculate distance as a crow flies. In another example, distance may be calculated based on estimated travel time between the user location and the airport location by querying the geographic information system 18 for a route and a travel time between the two locations. Such a query may specify a mode of transport, such as driving or travel on public transportation. In some embodiments, the selection based on distance may be made by determining that the travel time along such a route is less than a threshold travel time. Thus, in some embodiments, only those airports within the threshold distance of the user are candidate airports, and a plurality of candidate airports may be identified if the user is in an airport-dense region.

In some embodiments, selecting an origin airport further includes determining which of a plurality of candidate airports (e.g., the airports within the threshold distance) has the largest flight-volume value among the candidate airports. The flight-volume value may be any of a variety of different values that indicate the relative amount of flights departing from each of the candidate airports. For example, the flight-volume value may be obtained by querying the flights data store 32 from the origin selector 26 of FIG. 1 for an amount (e.g., a number or frequency) of flights departing from the candidate airports within some duration in the future, for instance a duration more than one month and less than one year, such as over the next six months. In another example, the flight-volume value may be based on other data indicative of the number of flights departing from an airport, such as a number of hits for an airport's name in a search engine index, survey responses from flyer surveys indicating the popularity of airports, or the amount of area occupied the by the airport as indicated by the geographic information system 18 of FIG. 1. Larger airports, carrying a higher volume of passengers, are expected to be more likely to be an origin airport for the user relative to smaller airports used less frequently.

In some cases, the flight-volume value is based on (e.g., equal to, proportional to, or a function of) the number of flights from the respective candidate airport that satisfy certain criteria. For instance, when the user query specifies a destination, the flight-volume value may be based on the number of flights to that destination. Or (i.e., and/or) in some cases, the contribution of the flights is weighted (or flights are filtered) according to additional criteria, e.g., flights to the destination may be down-weighted for each additional leg of the flight, such that a non-stop flight is weighted more heavily than multi-leg flights. Or some embodiments may calculate a flight-volume value by selecting only non-stop flights and disregarding flights with multiple legs.

In some embodiments, the process 34 includes obtaining a flight (i.e., information about the flight) departing from the selected airport, as indicated by block 42. Obtaining a flight departing from the selected airport may be performed by the flight finder 28 of FIG. 1 querying the flights data store 32 for flights from the selected origin airport to a destination airport within a window of time. The destination airport may be indicated by a query from the user, or the destination airport may be inferred as well, for example based on the frequency of flights to destinations from the origin airport, with the top two or three destinations being used to query the flights data store 32. Similarly, the window of time specified in the query to the flights data store 32 may either be specified in a query from the user or may be a default value, for example flights between one month in the future and two months in the future. In some embodiments, a plurality of flights may be obtained, and each flight may be associated with (e.g., with a one-to-one correlation) an airline name, a flight departure time, a flight cost, a flight duration, a number of available seats, and an indicator of whether the flight is a non-stop flight or includes a plurality of flight segments landing at intermediate airports. Other examples of flight information that may be obtained for one or more responsive flights includes information on flight schedules, aggregate or summarized information on flights, and information on all flights satisfying the criteria. Further, in some embodiments, the obtained flights may be ranked, and flights ranking lower than a threshold rank number may be omitted from subsequent steps.

In this embodiment, the process 34 includes presenting the obtained flights to the user, as indicated by block 44. Presenting the obtained flights may include transmitting to the user device 14 a description of the obtained flights and instructions to display the description. For example, the presented flights may be displayed in a browser executing on the client devices 14 of FIG. 1.

In some embodiments, the process 34 may include additional steps by which additional flight criteria are obtained before obtaining flights or presenting the obtained flights. For example, after selecting an origin airport, the origin airport may be used to initialize an airline search interface displayed on the client devices 14. The airline search interface may be a web page with user input fields for providing an origin airport, a destination airport, and travel dates. The origin airport in this interface may be initialized to the origin airport selected with step 40, and the user may change this value and input additional values into the interface, which are then used by the flight search engine 12 to identify responsive flights to be presented to the user.

Initializing the origin airport to a likely value is expected to relieve users of the burden of further specifying their query in instances in which the value is correct. Similarly, inferring an origin airport when none is provided in a user query allows users to express a query with less data entry than would otherwise be required while still receiving relevant results.

Figure 3:
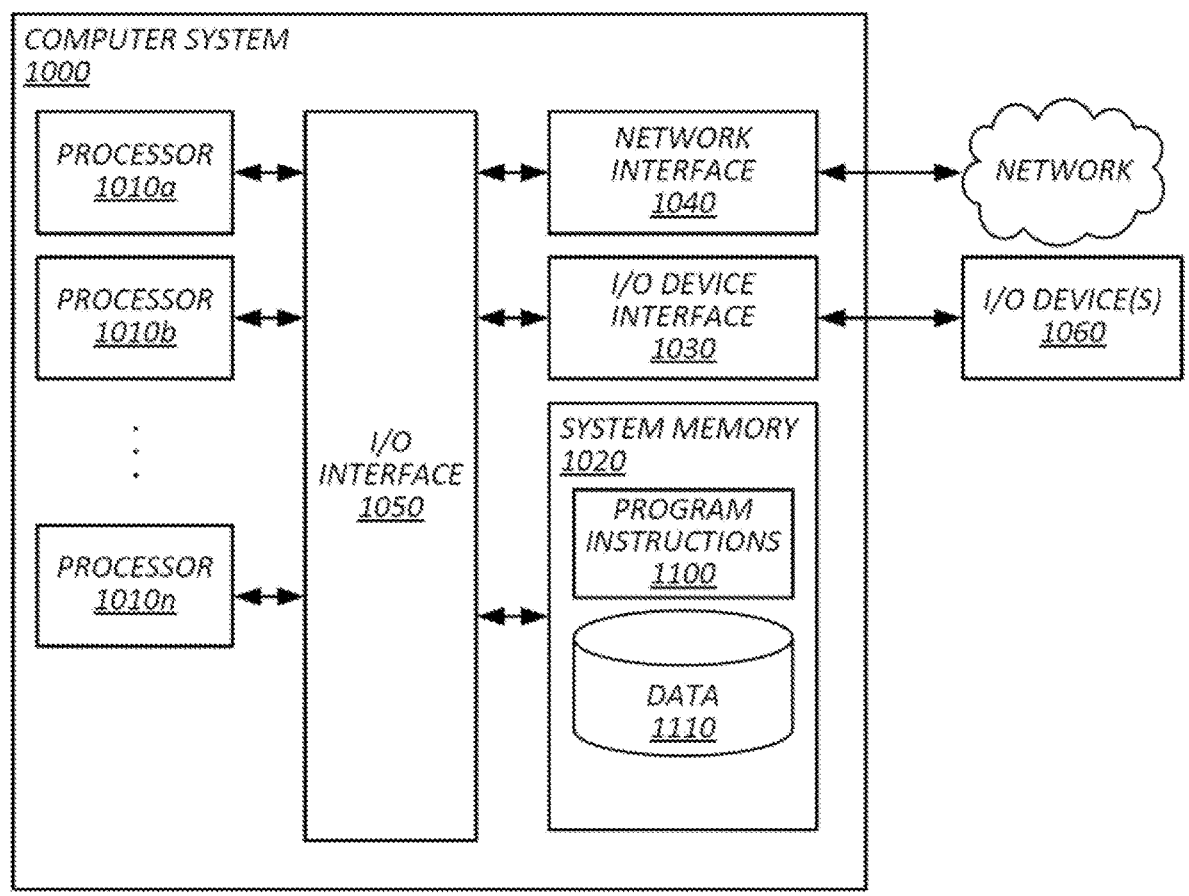
FIG. 3 illustrates an example of a computer system by which the above-mentioned systems and processes may be implemented.

FIG. 3 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030 and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area (WAN), a cellular communications network or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include, non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). In some embodiments, the program may be conveyed by a propagated signal, such as a carrier wave or digital signal conveying a stream of packets.

I/O interface 1050 may be configured to coordinate I/O traffic between processors 1010*a*-1010*n*, system memory 1020, network interface 1040, I/O devices 1060 and/or other peripheral devices. I/O interface 1050 may perform protocol, timing or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000, or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing or computing device is capable of manipulating or transforming signals, for instance signals represented as physical electronic, optical, or magnetic quantities within memories, registers, or other information storage devices, transmission devices, or display devices of the special purpose computer or similar special purpose processing or computing device.

What is claimed is:

1. A method to render graphical user interfaces to provide information about trips departing from origins proximate to current geographic locations of user computing devices, comprising, by one or more computing devices:

receiving from a user computing device associated with a user via a general search engine, a request comprising one or more terms;

determining, based on the one or more terms, that the request received via the general search engine comprises a request to obtain information about trips;

transmitting, to a trip search engine and in response to determining that the received request to obtain information comprises the request to obtain information about trips, a request for an origin;

receiving a determination from the trip search engine that the origin cannot be identified based on the one or more terms;

obtaining, in response to the determination from the trip search engine that the origin cannot be identified based on the one or more terms, a current geographic location of the user computing device, wherein the obtaining the current geographic location of the user computing device comprises:
  receiving location data from the user computing device, and
  determining a current geographic location of the user computing device based on the received location data;

selecting a particular candidate origin from one or more candidate origins, as a selected origin, based on both a distance from the current geographic location of the user computing device to a geographic location of the particular candidate origin and a trip volume value indicative of an amount of trips departing from the particular candidate origin;

identifying, from a trips data store, a plurality of trips departing from the selected origin;

obtaining information associated with at least one of the plurality of trips departing from the selected origin; and causing the user computing device to render, via a graphical user interface, the information associated with the at least one of the plurality of trips departing from the selected origin for presentation in a trip search interface, wherein the trip search interface comprises user input fields for providing an origin, a destination, a departure date, an arrival date, and wherein the selected origin is automatically input into the origin input field of the trip search interface.

2. The method of claim 1, wherein:

the current geographic location comprises a latitude and a longitude; and selecting the particular candidate origin further comprises, by the one or more computing devices:

determining that a plurality of candidate origins are within a threshold distance by, for each respective candidate origin in the plurality of candidate origins, calculating a distance between the respective candidate origin and the current geographic location of the user computing device, and determining that the calculated distance is less than the threshold distance;

obtaining, for each of the plurality of candidate origins, a flight-volume value comprising retrieving from the trips data store a number of trips scheduled to depart from the respective candidate origin within a window of time; and selecting the particular candidate origin within the threshold distance and having the largest number of scheduled trips among the plurality of candidate origins.

3. The method of claim 1, wherein the received request identifies a destination associated with the destination input field.

4. The method of claim 1, wherein the receiving the request to obtain information about trips comprises receiving a request for the trip search interface via an input, navigating to a trip search website, the received request for the trip search interface being expressed as a uniform resource identifier of the trip search website.

5. The method of claim 1, wherein the determining that the received request comprises the request to obtain information about trips further comprises determining that the one or more terms include a particular term in a list of terms associated with requests to obtain information about trips.

6. The method of claim 1, wherein the current geographic location of the user computing device specifies a location within less than a 10 km radius of an actual location of the user computing device.

7. The method of claim 1, further comprising retrieving, by the one or more computing devices, the one or more candidate origins that are within a threshold distance to the current geographic location of the user computing device.

8. The method of claim 7, wherein the retrieving the one or more candidate origins that are within the threshold distance to the location of the user computing device comprises, by the one or more computing devices:
filtering candidate origins in a flights data store by, for each filtered origin:
calculating a distance from the respective candidate origin to the current geographic location of the user computing device;
disregarding respective candidate origins having calculated distances greater than the threshold distance; and
including respective candidate origins having calculated distances less than the threshold distance in the retrieved one or more candidate origins that are within the threshold distance to the current geographic location of the user computing device.

9. The method of claim 7, wherein the distance comprises a driving distance obtained along a driving route to a candidate origin.

10. The method of claim 7, wherein the selecting the particular candidate origin further comprises, by the one or more computing devices:
obtaining, for each of the one or more candidate origins, the trip volume value indicative of a number of trips departing from the respective candidate origin; and
selecting, as the particular candidate origin, a candidate origin of the one or more candidate origins that is within the threshold distance and that comprises a largest trip volume value.

11. The method of claim 7, wherein the selecting the particular origin further comprises, by the one or more computing devices:
selecting an origin airport among a plurality of airports based on a number of legs of flights between the origin airport and the destination identified in the request to obtain information about flights.

12. The method of claim 7, wherein the selecting the particular candidate origin further comprises, by the one or more computing devices:
obtaining, for each of the one or more candidate origins, a trip volume value indicative of a number of trips departing from or arriving at the particular candidate origin; and
selecting, as the selected origin, the particular candidate origin within the threshold distance and having the largest number of trips.

13. The method of claim 12, wherein the number of trips is scheduled to depart over a duration of time in the future.

14. The method of claim 1, wherein:
the received request comprises a query string received into a text input field of a search engine interface of the general search engine displayed in a browser window of the user computing device;
the current geographic location of the user computing device comprises a latitude and longitude coordinate point indicating a likely location of the user computing device;
the selecting the particular candidate origin comprises identifying one candidate origin of the one or more candidate origins from which the user is deemed likely to depart, wherein the selection is based on only the distance and the trip volume value; and
the obtaining information associated with the at least one of the plurality of trips departing from the selected origin comprises specifying for each of the at least one of the plurality of trips, a respective trip provider system, a respective trip duration, a respective value, and a respective designation of whether the trip is non-stop or includes a plurality of trip segments arriving at intermediate stops.

15. The method of claim 1, wherein the causing the user computing device to render, via the graphical user interface, the information associated with the at least one of the plurality of trips departing from the selected origin for presentation in the trip search interface, comprises providing instructions to the user computing device to render, via the graphical user interface, the information associated with the at least one of the plurality of trips departing from the selected origin for presentation in the trip search interface.

16. A system to render graphical user interfaces to provide information about trips departing from origins proximate to current geographic locations of user computing devices, comprising:
one or more processors; and
a memory storing program code that when executed by the one or more processors causes the one or more processors to perform operations comprising:
receiving from a user computing device associated with a user via a general search engine, a request comprising one or more terms;
determining, based on the one or more terms, that the request received via the general search engine comprises a request to obtain information about trips;
transmitting, to a trip search engine and in response to determining that the received request to obtain information comprises the request to obtain information about trips, a request for an origin;
receiving a determination from the trip search engine that an origin cannot be identified based on the one or more terms;
obtaining, in response the determination from the trip search engine that the origin cannot be identified based on the one or more terms, a current geographic location of the user computing device, wherein the obtaining the current geographic location of the user computing device comprises:
receiving location data from the user computing device, and
determining a current geographic location of the user computing device based on the received location data;
selecting a particular candidate origin from one or more candidate origins, as a selected origin, based on both a distance from the current geographic location of the user computing device to a geographic location of the particular candidate origin and a trip volume value indicative of an amount of trips departing from the particular candidate origin;

identifying, from a trips data store, a plurality of trips departing from the selected origin;

obtaining information associated with at least one of the plurality of trips departing from the selected origin; and causing the user computing device to render, via a graphical user interface, the information associated with the at least one of the plurality of trips departing from the selected origin for presentation in a trip search interface, wherein the trip search interface comprises user input fields for providing an origin, a destination, a departure date, an arrival date, and wherein the selected origin is automatically inputted into the origin input field of the trip search interface.

17. The system of claim 16, wherein the determining that the received request comprises the request to obtain information about trips further comprises determining that the one or more terms include a particular term in a list of terms associated with requests to obtain information about trips.

18. The system of claim 16, wherein the selecting a particular candidate origin further comprises:

obtaining, for each of the one or more candidate origins, the trip volume value indicative of a number of trips departing from the respective candidate origin; and selecting, as the particular candidate origin, a candidate origin of the one or more candidate origins that is within the threshold distance and that comprises a largest trip volume value.

19. A computer program product to render graphical user interfaces to provide information about trips departing from origins proximate to current geographic locations of user computing devices, comprising:

a non-transitory, computer-readable storage medium comprising computer-executable instructions that when executed by the computer causes the computer to perform operations comprising:

receiving from a user computing device associated with a user via a general search engine, a request comprising one or more terms;

determining, based on the one or more terms, that the request received via the general search engine comprises a request to obtain information about trips;

transmitting, to a trip search engine and in response to determining that the received request to obtain information comprises the request to obtain information about trips, a request for an origin;

receiving a determination from the trip search engine that the origin cannot be identified based on the one or more terms;

obtaining, in response the determination from the trip search engine that the origin cannot be identified based on the one or more terms, a current geographic location of the user computing device, wherein the obtaining the current geographic location of the user computing device comprises:

receiving location data from the user computing device, determining a current geographic location of the user computing device based on the received location data;

selecting a particular candidate origin from one or more candidate origins, as a selected origin, based on both a distance from the current geographic location of the user computing device to a geographic location of the particular candidate origin and a trip volume value indicative of an amount of trips departing from the particular candidate origin;

identifying, from a trips data store, a plurality of trips departing from the selected origin;

obtaining information associated with at least one of the plurality of trips departing from the selected origin; and causing the user computing device to render, via a graphical user interface, the information associated with the at least one of the plurality of trips departing from the selected origin for presentation in a trip search interface, wherein the trip search interface comprises user input fields for providing an origin, a destination, a departure date, an arrival date, and wherein the selected origin is automatically input into the origin input field of the trip search interface.

20. The computer program product of claim 19, wherein the determining that the received request comprises the request to obtain information about trips further comprises determining that the one or more terms include a particular term in a list of terms associated with requests to obtain information about trips.

* * * * *